April 23, 1946.  L. A. LEHRMAN  2,399,047
SNUBBER
Filed Nov. 16, 1942  2 Sheets-Sheet 1
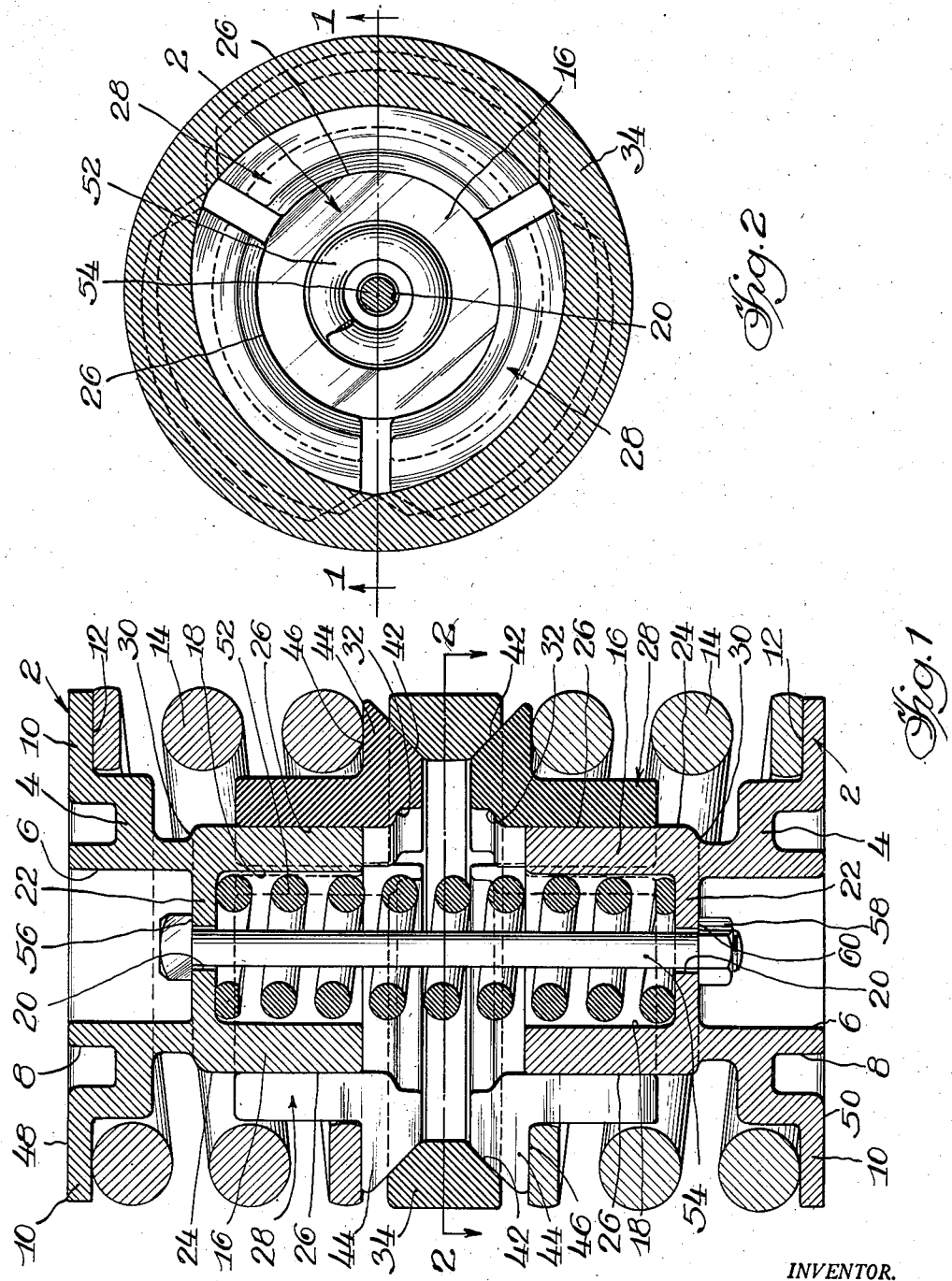
INVENTOR.
Leo A. Lehrman
Atty.

April 23, 1946.  L. A. LEHRMAN  2,399,047
SNUBBER
Filed Nov. 16, 1942  2 Sheets-Sheet 2
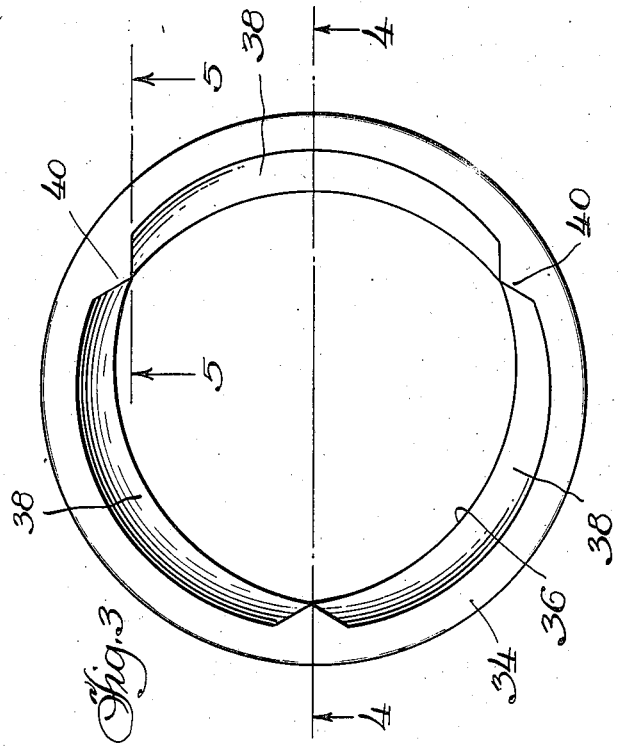
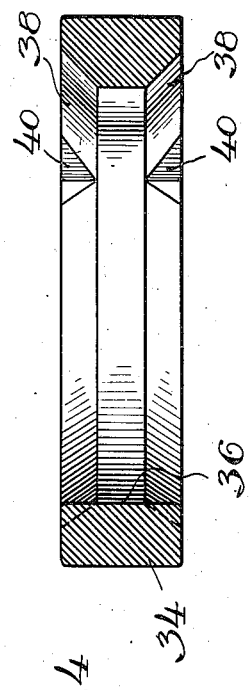
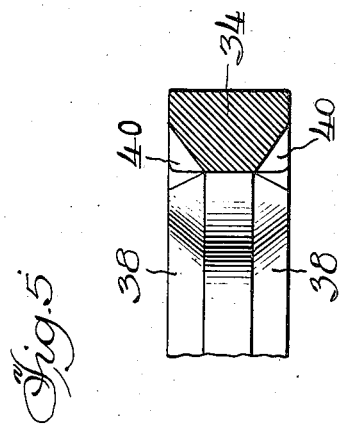
INVENTOR.
Leo A. Lehrman Patented Apr. 23, 1946

2,399,047

UNITED STATES PATENT OFFICE 2,399,047

SNUBBER

Leo A. Lehrman, Chicago, Ill., assignor to American Steel Foundries, Chicago, Ill., a corporation of New Jersey Application November 16, 1942, Serial No. 465,651

22 Claims. (Cl. 267—9)

My invention relates to friction absorbing devices and more particularly to such a device commonly called a snubber and utilized in conjunction with a group or nest of coil springs affording support from the frame of a railway car truck for an associated bolster, said snubber serving to dampen oscillations of the associated springs in such manner as to substantially eliminate harmonious vibrations or oscillations of said springs.

An object of my invention is to design a snubber such as above described in which spaced followers are each frictionally engaged by a set of associated friction shoes, a wedge member being interposed between the respective sets of shoes and in wedge engagement therewith and a coil spring being sleeved over each follower and seated thereagainst and against the associated set of shoes.

A further object of my invention is to design a snubber such as above described in which the wedge member is provided with an opening therethrough for the reception of an auxiliary resilient member seated at opposite ends thereof against the respective followers.

Still another object of my invention is to design a novel means of maintaining the snubber in assembly on the release stroke thereof, said means comprising a rigid member extending through the auxiliary resilient member and slidably interlocked at opposite ends thereof with the respective followers.

My invention comprehends a wedge member of novel form, said wedge member comprising an opening therethrough and a plurality of diagonal wedge surfaces formed on opposite sides thereof about the margin of said opening.

In the drawings, Figure 1 is a sectional view of my novel snubber taken substantially in the vertical plane bisecting the device, as indicated by the line 1—1 of Figure 2, and Figure 2 is a further sectional view taken substantially in the horizonal plane bisecting the device, as indicated by the line 2—2 of Figure 1.

Figures 3, 4 and 5 show my novel form of wedge member, Figure 3 being a plan view thereof, Figure 4 being a sectional view taken in the plane indicated by the line 4—4 of Figure 3, and Figure 5 being a further sectional view taken in the plane indicated by the line 5—5 of Figure 3.

Describing my invention in detail, the snubber comprises identical top and bottom followers generally designated 2, 2 and each comprising a base 4 formed with a central recess 6 preferably of cylindrical contour and adapted for the reception of positioning means on the associated supporting or supported member as will be clearly apparent to those skilled in the art. Around the recess 6 an annular recess 8 may be formed in order to lighten the base 4, said base comprising the annular flange 10 partly defining the recess 8 and affording a seat at 12 for one end of the associated coil spring 14 serving a purpose hereinafter more fully described.

Integrally formed with the base 4 of each follower 2 is a hollow friction stem 16 preferably in the form of a cylinder with a central cavity 18 communicating with the recess 6 by means of a passage 20 extending through the web 22 of the stem 16 defining the inner ends of the cavity 18 and the recess 6. The stem 16 is provided with an exterior friction surface 24 preferably of cylindrical form and in engagement at 26, 26 with a plurality of friction shoes generally designated 28, 28, the surface 24 and the complementary surfaces on the shoes being relieved as at 30 and 32 respectively to prevent the formation of shoulders thereon. It will be understood that although the engaging surfaces of the shoes and the friction stems are here shown as substantially vertical and cylindrical, if desired, these surfaces may be diagonal or V-shaped, as will be clearly apparent to those skilled in the art, in order to obtain a snubber of any desired characteristics.

Interposed between the shoes 28, 28 associated with the stems of the respective followers 2, 2 is a wedge member 34 here shown in the form of a ring. The wedge member 34 is shown in detail in Figures 3, 4 and 5 and comprises an opening 36 therethrough. Formed about the margin of said opening, and on the inner periphery of the member 34 are top and bottom diagonal and preferably cylindrical friction faces 38, 38, the surfaces on each side of the member 34 being spaced by means of projections 40, 40 formed about the inner periphery thereof and said surfaces are in complementary wedge engagement at 42, 42 with ledges 44, 44 formed on the respective friction shoes 28, 28.

It will be understood that although the wedge member 34 is here illustrated in the form of a ring, if desired, said member may be of any convenient form such as a square or a triangle in order to accommodate varying arrangements of the friction shoes and the associated stems. For example, if four shoes were associated with each follower it might be desirable to form the wedge 34 in the shape of a square.

Each of the springs 14, 14 is seated at one end thereof as at 12 against the flange 10 on the associated follower and is seated at the opposite end thereof as at 46 against the ledges 44, 44 on the associated friction shoes in order to urge said shoes into engagement with the wedge 34 and the associated friction stem 16 as heretofore described, said springs 14, 14 also serving to support the load of the associated member supported as at 48 on the top follower 2, the snubber being seated as at 50 on the bottom follower in the customary manner. It will be understood that if desired, one spring 14 may be longer than the other, and furthermore the springs 14, 14 may be formed of rubber or any suitable resilient material.

An auxiliary spring 52 extends through the opening 36 in the wedge 34 and is seated at opposite ends thereof against the respective webs 22, 22 at the inner ends of the cavities 18, 18 in the respective friction stems 16, 16, said auxiliary spring 52 affording additional load capacity for the snubber as will be clearly apparent to those skilled in the art. In the event that this additional load capacity is not required, it will be understood that the spring 52 may be omitted.

A securing member 54, preferably in the form of a bolt, is sleeved within the auxiliary spring 52 and extends through the passages 20, 20, the head of the bolt being seated at 56 against the web 22 of the top follower and the nut 58 threaded on the opposite end of said bolt being seated at 60 against the web 22 of the bottom follower in the released position of the snubber. It will be understood that on the compression stroke the followers will be afforded movement toward each other, the bolt 54 sliding within the passages 20, 20, and on the release stroke the bolt and nut assembly 54, 58 will retain the device in assembled relationship by limiting movement of the followers away from each other.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a friction absorbing device, top and bottom followers each presenting a friction stem, a plurality of friction shoes in complementary engagement with each stem, a coil spring sleeved over each stem and seated at opposite ends against the shoes associated with said stem and against the associated follower, a ring intermediate the shoes associated with the respective followers and in wedge engagement with all of said shoes, an auxiliary coil spring extending through said ring and seated at opposite ends thereof against said stems, and a rigid member sleeved within said auxiliary coil spring and slidably interlocked at opposite ends thereof with the respective followers to limit movement of said followers away from each other.

2. In a friction absorbing device, top and bottom followers each presenting a substantially cylindrical friction member, a plurality of friction shoes in complementary engagement with the outer surface of each member, resilient means seated against said shoes and a seat on the associated follower, a ring intermediate the shoes associated with the respective followers and in wedge engagement with all of said shoes, and an auxiliary resilient element extending through said ring between said members and seated thereagainst.

3. In a friction absorbing device, top and bottom followers each presenting a substantially cylindrical friction stem, a set of friction elements in complementary engagement with each stem, resilient means sleeved over each stem and seated at opposite ends thereof against said elements and a seat on the associated follower, a ring intermediate the sets of elements associated with the respective followers and in wedge engagement with all of said elements, and an auxiliary resilient member extending through said ring between said stems and seated thereagainst.

4. In a friction absorbing device, top and bottom followers each presenting a substantially cylindrical friction stem, a plurality of friction shoes in complementary engagement with the outer surface of each stem, resilient means sleeved over each stem and seated against said shoes and the associated follower, a wedge intermediate the shoes associated with the respective followers and in wedge engagement with all of said shoes, an opening through said wedge, and a resilient element extending through said opening between said stems and seated thereagainst.

5. In a friction absorbing device, top and bottom followers each presenting a friction stem, a plurality of friction shoes in complementary engagement with each stem, a coil spring sleeved over each stem and seated at opposite ends against the shoes associated with said stem and against the associated follower, a ring intermediate the shoes associated with the respective followers and in wedge engagement with all of said shoes, and an auxiliary coil spring extending through said ring and seated at opposite ends thereof against said stems.

6. In a friction absorbing device, spaced followers each presenting a friction element, friction shoes in frictional engagement with the element of each follower, a member intermediate the shoes engaged with the respective elements in wedge engagement with said shoes, an opening through said member, resilient means sleeved over each element and seated at opposite ends against the associated follower and the adjacent friction shoes, and a retaining member extending through said opening and slidably interlocked at opposite ends thereof with the respective followers.

7. In a friction absorbing device, spaced followers each presenting a friction element, friction shoes in frictional engagement with the element of each follower, a member intermediate the shoes engaged with the respective elements in wedge engagement with said shoes, and a coil spring sleeved over each element and seated at opposite ends thereof against the associated follower and the adjacent shoes.

8. In a friction absorbing device, spaced followers each presenting a friction element, friction shoes in frictional engagement with the element of each follower, a member intermediate the shoes associated with the respective elements in wedge engagement with said shoes, an opening through said member, resilient means seated against each follower and the shoes associated therewith, and an independent resilient member extending through said opening and seated against said followers.

9. In a friction absorbing device, top and bottom followers each presenting a friction stem, a set of friction shoes in complementary engagement with each stem, resilient means seated at opposite ends thereof against each follower and the associated set and an annular wedge interposed between the sets of shoes associated with the respective followers and in wedge engagement with all of said shoes, and a resilient member within said resilient means, said member extending through said wedge and seated at opposite ends thereof against said stems.

10. In a friction absorbing device, spaced followers each presenting a friction element, friction shoes in frictional engagement with the element of each follower, a member intermediate the shoes engaged with the respective elements and in wedge engagement with said shoes, and resilient means seated against each follower and the shoes associated therewith, said resilient means being sleeved over respective of said elements.

11. In a friction absorbing device, spaced followers, friction shoes engaged with respective followers, a wedge member intermediate the shoes associated with the respective followers, resilient means compressed between each follower and the shoes associated therewith, and an independent resilient member compressed by and between said followers, said wedge member having on opposite sides thereof wedge faces converging toward the longitudinal axis of the device, the faces on each side of said wedge member being in complementary engagement with the shoes associated with one of said followers.

12. In a friction absorbing device, spaced followers, friction shoes engaged with respective followers, wedge means intermediate the shoes associated with the respective followers, resilient means compressed between each follower and the shoes associated therewith, and a resilient member within said resilient means, said member extending between said followers and seated against both thereof.

13. In a friction absorbing device, spaced followers, each comprising a base and a hollow friction member projecting therefrom, sets of friction elements frictionally engaging respective members, an annular wedge between said sets and having on opposite sides thereof wedge faces in wedge engagement therewith, resilient means sleeved over each member and seated against the base thereof and the associated set of elements, and a coil spring extending within and seated at opposite ends thereof against both members.

14. In a friction device, spaced followers each comprising a friction member, a set of friction elements engaging each member, wedge means between said sets in wedge engagement therewith, and resilient means sleeved over each member and seated against the associated follower and the associated set of elements.

15. In a friction absorbing device, spaced followers, each comprising a base and a hollow friction member projecting therefrom, an annular wedge element between said followers, friction shoes on opposite sides of said element in diagonal face engagement therewith and in frictional engagement with the adjacent member, resilient means sleeved over each member and seated against the base thereof and the associated friction shoes, and a resilient member extending between and within each member and bearing against both of said members.

16. In a friction absorbing device, spaced followers, each comprising a base and a friction member projecting therefrom, an annular wedge element between said followers, friction shoes in wedge engagement with said element and in frictional engagement with respective members, a coil spring sleeved over each member and seated against the base thereof and the adjacent shoes, and resilient means housed within and seated against both of said members.

17. In a friction device, spaced followers each comprising a friction member, a set of friction elements engaging each member, annular wedge means between and spacing said sets in wedge engagement therewith, resilient means seated at opposite ends thereof against each follower and the associated set, and independent resilient means extending through said wedge means and seated against both members.

18. In a friction device, spaced followers each comprising a friction member, a set of friction elements frictionally engaging the exterior surface of each member, wedge means between the sets of friction elements associated with respective members, said wedge means being in wedge engagement with both sets, and resilient means seated against each follower and the associated set.

19. In a friction device, spaced followers each comprising a friction member, sets of friction elements frictionally engaging respective members, a wedge member between and spacing said sets, said wedge member having on opposite sides thereof wedge faces converging toward the longitudinal axis of the device, the wedge faces on each side of said wedge member being in complementary wedge engagement with one of said sets of elements, and resilient means seated against each follower and the associated set of elements.

20. In a friction device, spaced followers each comprising a friction member, sets of friction elements frictionally engaging respective members, a wedge member between and spacing said sets, said wedge member having on opposite sides thereof wedge faces converging toward the longitudinal axis of the device, the wedge faces on each side of said wedge member being in complementary wedge engagement with one of said sets of elements, resilient means seated against each follower and the associated set of elements, and resilient means extending between and engaging both followers.

21. In a friction device, spaced followers each comprising a friction member, friction elements engaging respective members, wedge means between and spacing said elements in wedge engagement therewith, and resilient means sleeved over each member and seated against the associated follower and the associated element.

22. In a friction device, spaced followers each comprising a friction member, friction elements engaging respective members, wedge means between and spacing said elements in wedge engagement therewith, resilient means sleeved over each member and seated against the associated follower and the associated element, and resilient means housed within and seated against both of said members.

LEO A. LEHRMAN.